H. P. GAGE.
OPTICAL PROJECTING SYSTEM.
APPLICATION FILED JULY 26, 1919.
1,395,338.
Patented Nov. 1, 1921.
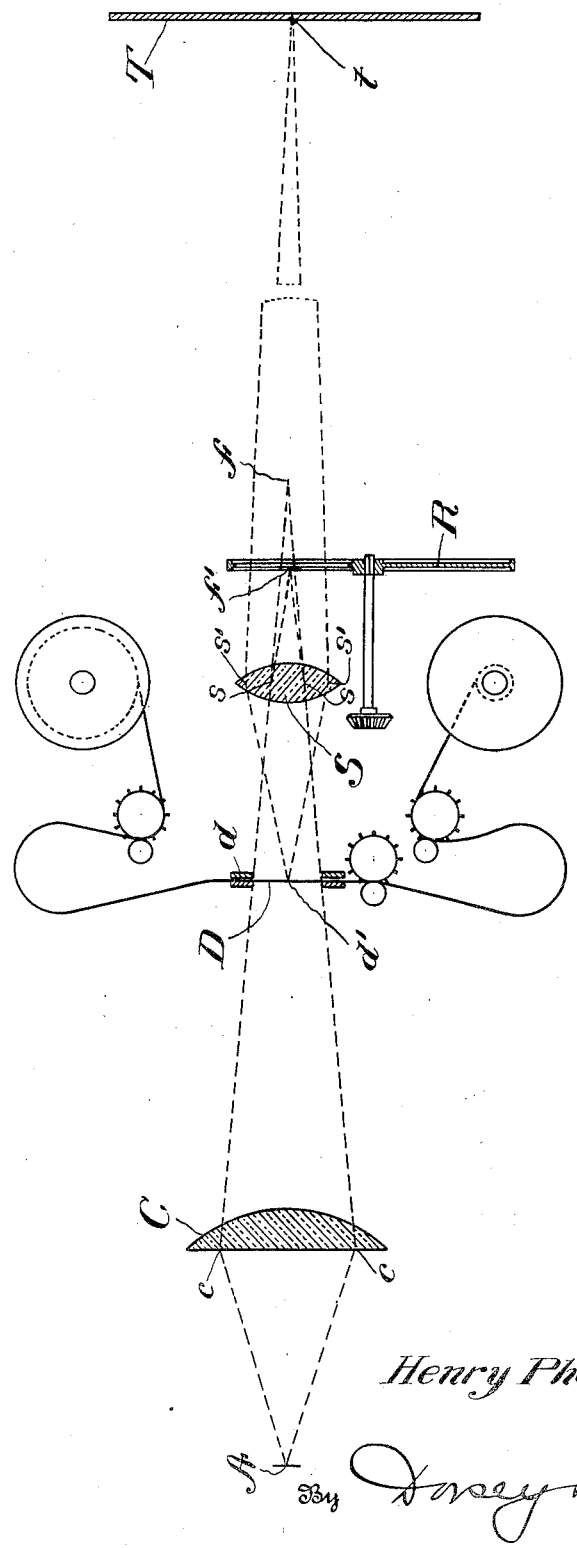
Inventor
Henry Phelps Gage
By
Attorney

UNITED STATES PATENT OFFICE.

HENRY PHELPS GAGE, OF CORNING, NEW YORK, ASSIGNOR TO CORNING GLASS WORKS, OF CORNING, NEW YORK, A CORPORATION OF NEW YORK.

OPTICAL PROJECTING SYSTEM.

1,395,338. Specification of Letters Patent. Patented Nov. 1, 1921.

Application filed July 26, 1919. Serial No. 313,555.

*To all whom it may concern:*

Be it known that I, HENRY PHELPS GAGE, a citizen of the United States of America, and a resident of the city of Corning, county of Steuben, and State of New York, have invented certain new and useful Improvements in Optical Projecting Systems, of which the following is a specification.

It is frequently desirable to experimentally and accurately set an artificial light, used as a source of illumination in a projecting system, in respect to the condenser of such system, for as well known the evenness of illumination of the picture to be projected depends on the exactness of such setting. This is difficult and tiresome if the only guide is the extent to which the illumination approximates a desired standard. The present invention seeks to overcome these difficulties by so constructing the apparatus employed that the operator is merely called upon to so adjust the light source in respect to the condenser that the condenser will, supplemented by the objective, bring the light source to a sharp focus located at a plane properly selected in view of the characteristics of the condenser. For this purpose, it consists in the several features hereinafter described and claimed.

In the accompanying drawing, which is a diagrammatic view, I have shown my invention applied to a moving picture projector.

A— is a suitable light source; C— is a condensing lens adapted to cause the light source to properly illuminate the picture to be projected (*i. e.*, the film) which is located in the image plane D at the window in the aperture plate d; S— is the usual objective lens adjustable to and from the aperture plate for focusing an image of the film or of the window in the aperture plate on the screen T, herein designated as the picture screen, and R— is a screen, herein called the light source screen, located in front of and close to the objective. In practice, the last named screen may, as shown, be formed by the shutter of the projector. In any event it should be capable of being moved across the optical axis of the projector to receive an image as will be hereinafter described.

In order to secure an even illumination of the film by light from the source A as refracted by the condenser, it has been, in certain cases, the practice to so select the condenser that it will bring the light from the source to as perfect a focus as permitted by its spherical aberration at some point beyond (in front) of the film, and, as stated, it is desirable in order to secure proper illumination of film, that the light source be accurately positioned in respect to the condenser. Due to lack of uniformity in manufacture of commercial electric lamps it has been difficult to do this by setting such lamps to a calculated position, and it has also been difficult to determine the proper position experimentally. By the invention now to be described, the experimental setting of the light source in respect to the condenser is rendered easy.

For purposes of illustration it will be presumed that the condensing lens is one in which rays A—$c$, A—$c$ from the source A are brought by a restricted (*i. e.*, the central) portion of the condenser, to a relatively sharp focus at a given point $f$, as shown by the lines $c$—$f$, $c$—$f$, and that other rays from the source will be so refracted by other portions of the condenser as to evenly illuminate the film. One example of such a condensing lens is shown in the application filed by myself and William Churchill on the 12th day of January, 1917, and serially numbered 142,094. To focus the restricted portion of the condenser at the point $f$, requires that the light source be accurately positioned, so that it is in conjugate focus (considering the restricted portion of the condenser) in respect to $f$. This can be easily done, if the location of $f$ (which should be in front of the objective lens and the light source screen) and the location of the plane of that screen are such that, when the objective is in a given position, it will, as one element of a doublet (the other element of which is the restricted portion of the condenser,) focus a sharp image of the light source on the shutter as is shown by the lines $c$—$s$—$f'$, $c$—$s$—$f'$. This given position of the objective may be that which it should occupy when focusing a film picture upon a screen T at a distance from the projector for which the apparatus is calculated or generally used, or may be that which the objective will occupy when so focused on a screen set up at any given distance from the projector. It is obvious that the given position of the objective, may, when determined, be properly marked, on the mounting of the objective.

With the parts above described assembled, but not focused, the objective is set at the desired position, if marked on its mounting, or moved back and forth until the plate aperture $d'$ is focused, as indicated by the lines $d'—s'—t$, $d'—s'—t$, on the picture screen T located at the proper distance. The shutter R— is then interposed in the optical axis and the source A— is moved back and forth until it is sharply focused on the shutter R, as shown by the lines $A—c—s—f'$, $A—c—s—f'$, which will be the desired position.

While I have above described, and in the accompanying drawing, shown this invention as applied to a moving picture projector, in which the picture to be projected is on a film, it will be obvious that it is equally applicable to magic lanterns, and to the projection of lantern slides, and that the screen R— instead of being the shutter of a moving picture projector, may be by any suitable screen, adapted to receive the image of the light source, properly positioned in accordance with the rule herein set forth.

It will of course, also be understood that the showing of the condenser and objective lenses in the drawing is only conventional (such showing being adopted because of ease of illustration) and that preferred and more perfect types of such lenses may be employed in practice.

Having thus described my invention what I claim and desire to secure by Letters Patent is:—

1. In an optical projector, the combination of a light source, a condenser, an objective lens, and a screen to receive the image of the light source, a restricted portion of the condenser focusing the rays from light source in front of the screen, such portions of the condenser and the objective lens together having conjugate foci at the light source and screen when the light source is properly placed to illuminate the picture to be projected and the objective lens is at a given position.

2. In an optical projector, the combination of a light source, a restricted portion of the condenser focusing the rays from the light source in front of the said screen; and for illuminating a picture to be projected, an objective lens, a screen to receive the image of the light source, a screen to receive a picture image projected by the objective lens, the objective lens and the restricted portion of condenser together having conjugate foci at the first named screen and at the light source when the objective lens is positioned to have conjugate foci at the picture to be projected and at the last named screen.

In testimony whereof I hereunto affix my signature this 23 day of July, 1919.

HENRY PHELPS GAGE.